(12) United States Patent
Tyan

(10) Patent No.: US 10,407,010 B2
(45) Date of Patent: Sep. 10, 2019

(54) CELLULAR STRUCTURES WITH EIGHT-SIDED CELLS

(71) Applicant: Ford Global Technologies, LLC, Dearborn, MI (US)

(72) Inventor: Tau Tyan, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 253 days.

(21) Appl. No.: 15/670,621

(22) Filed: Aug. 7, 2017

(65) Prior Publication Data

US 2019/0039541 A1    Feb. 7, 2019

(51) Int. Cl.
*B60R 19/18* (2006.01)
*B60R 21/04* (2006.01)
*B60R 19/34* (2006.01)
*F16F 7/12* (2006.01)

(52) U.S. Cl.
CPC .............. *B60R 19/18* (2013.01); *B60R 19/34* (2013.01); *B60R 21/04* (2013.01); *F16F 7/121* (2013.01); *B60R 2019/1866* (2013.01); *B60R 2021/0421* (2013.01); *B60R 2021/0435* (2013.01); *B60R 2021/0442* (2013.01)

(58) Field of Classification Search
None
See application file for complete search history.

(56) References Cited

U.S. PATENT DOCUMENTS 8,539,737 B2    9/2013  Tyan et al.
2017/0307137 A1*  10/2017  Tyan .................... E04C 2/36

* cited by examiner

*Primary Examiner* — David Sample
*Assistant Examiner* — Elizabeth Collister
(74) *Attorney, Agent, or Firm* — Vichit Chea; Brooks Kushman P.C.

(57) ABSTRACT

A strengthening member for an automobile includes a cellular structure having a plurality of cells. A cross section of each cell has eight sidewalls interconnected at eight corners to define a closed polygon. The sidewalls define eight internal angles located at the corners. Two of the internal angles are acute and two of the internal angles are reflex.

20 Claims, 5 Drawing Sheets

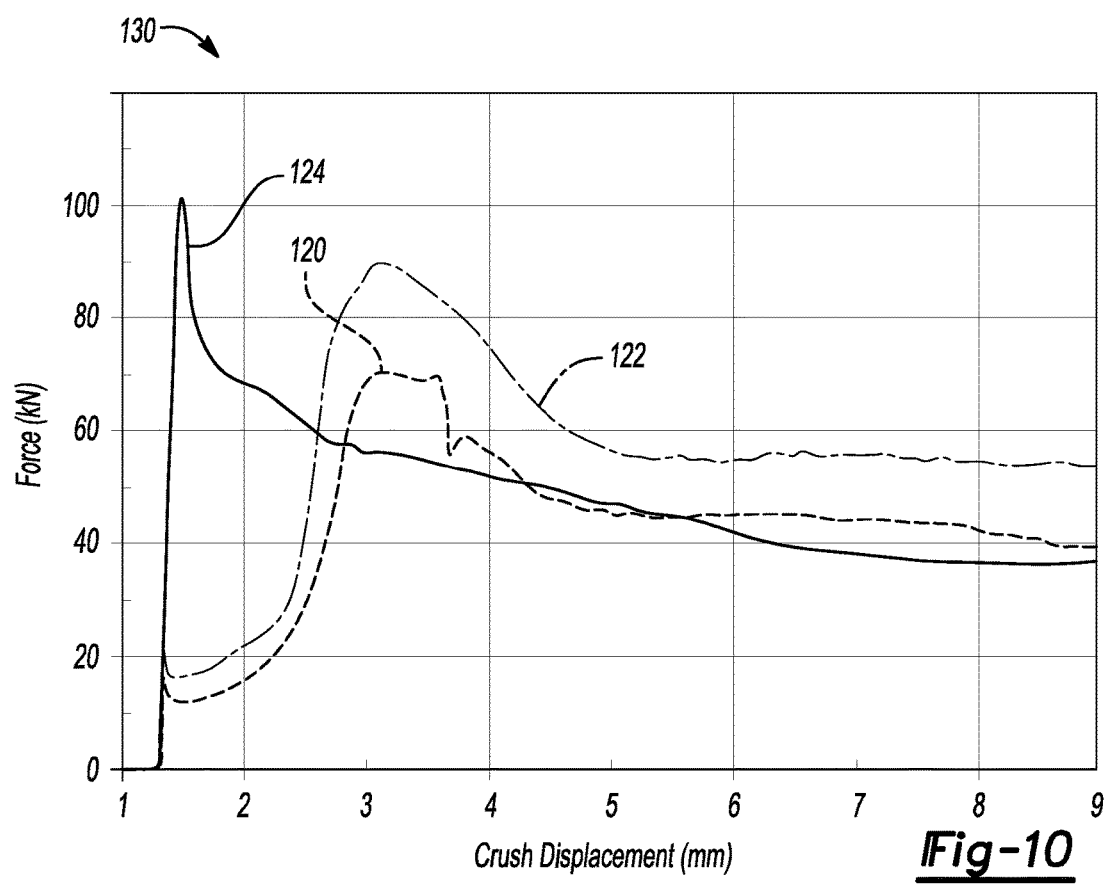

US 10,407,010 B2

CELLULAR STRUCTURES WITH EIGHT-SIDED CELLS

TECHNICAL FIELD

This disclosure relates to strengthening members having a cellular structure formed of a plurality of cells. The cells have a cross section of eight sides interconnected at eight corners.

BACKGROUND

Structural components may be reinforced with cellular structures. One example of such cellular structures includes a plurality of hexagonal cells and is typically referred to as a honeycomb. Honeycombs are used in a variety of applications including automotive, aerospace, sporting goods, and building materials.

SUMMARY

According to one embodiment, a strengthening member for an automobile includes a cellular structure having a plurality of cells. A cross section of each cell has eight sidewalls interconnected at eight corners to define a closed polygon. The sidewalls define eight internal angles located at the corners. Two of the internal angles are acute and two of the internal angles are reflex.

According to another embodiment, a strengthening member includes a cellular structure having a plurality of cells. A cross section of each cell has eight sidewalls interconnected at eight corners. The sidewalls are arranged to form a concave polygon with two of the corners having an acute internal angle.

According to yet another embodiment, a vehicle beam includes a tubular member and a cellular structure disposed in the tubular member. The cellular structure includes a plurality of cells. A cross section of each cell is a closed, concave polygon with eight sidewalls interconnected at eight corners.

BRIEF DESCRIPTION OF THE DRAWINGS

FIG. 10 is a graph showing crush force displacement results of a quasi-static loading test for the specimens of FIGS. 5, 6, and 7.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
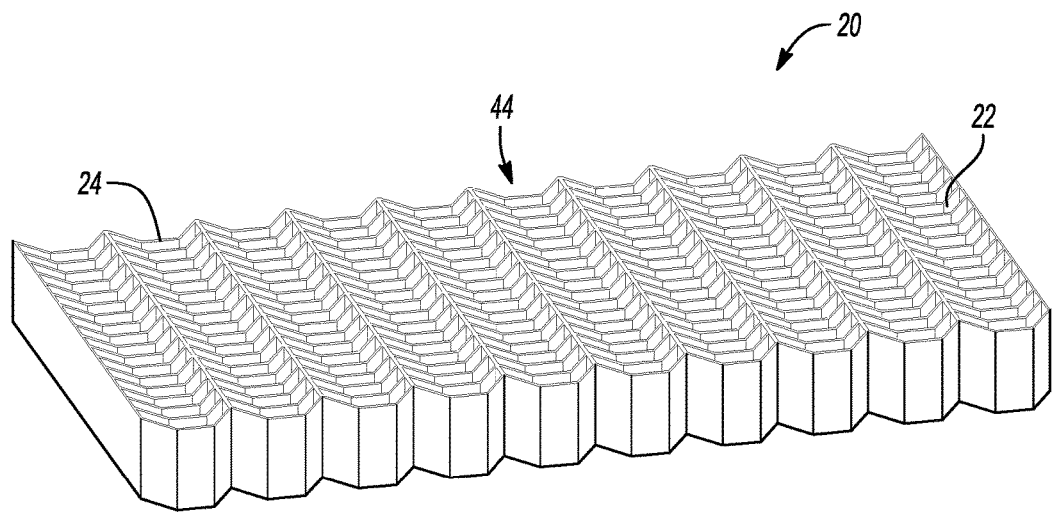
FIG. 1 is a perspective view of a strengthening member having a cellular structure with eight-sided cells.
Figure 2:
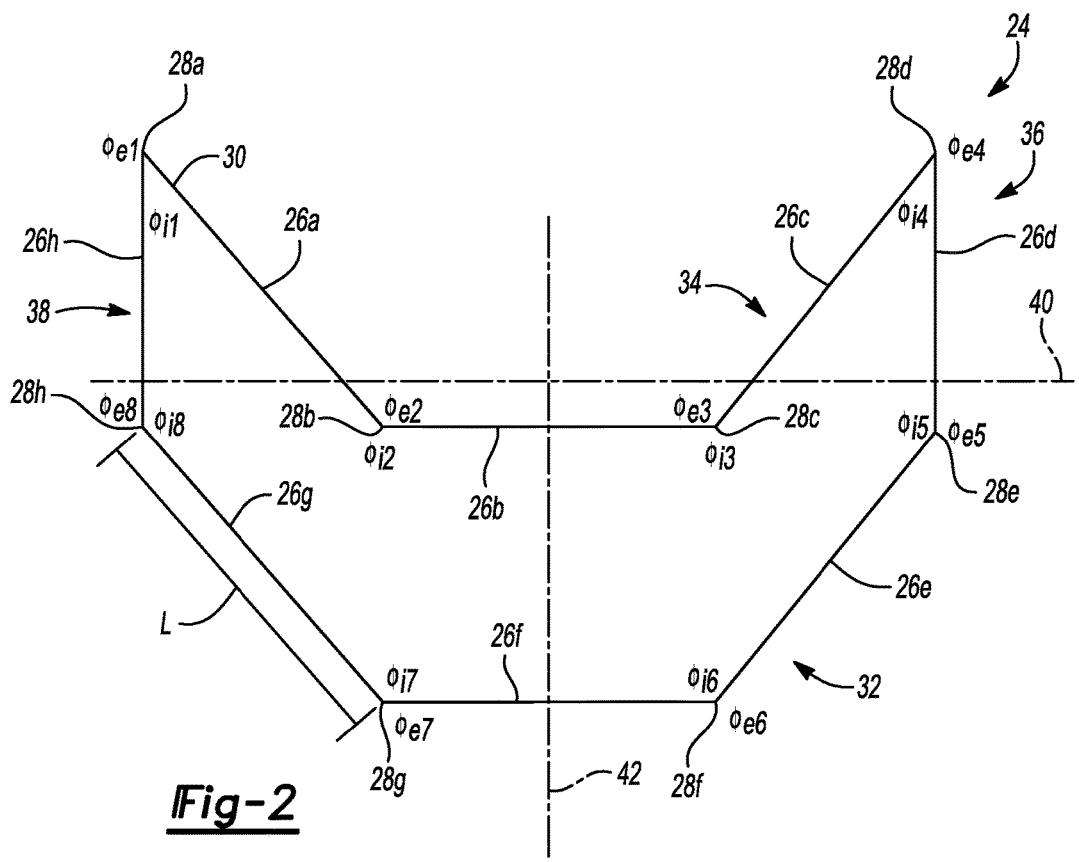
FIG. 2 is an enlarged diagrammatical view of one of the eight-sided cells.

Referring to FIGS. 1 and 2, a strengthening member 20 may include a cellular structure 22 having a plurality of cells 24 that are interconnected and nested with each other to form the cellular structure 22. The cellular structure 22 may be used as a stand-alone structure. One stand-alone application is as an energy absorbing component in a vehicle. The cellular structure 22 may be formed into a generally planar sheet, as shown, and placed in select locations on a vehicle to absorb energy during a collision or other event. For example, the cellular structure 22 could be placed in the headliner to absorb energy during an impact between an occupant and the headliner, or may be placed on a side rail to absorb energy during a side-impact collision. For example, the strengthening member 20 could be used to reinforce the rockers, side rails, B-pillars, hinge-pillars, or roof rails for side impact protection. The strengthening members may help absorb impact energy and result in reduced intrusions in to the passenger compartment when used in these areas.

The cellular structure 22 may also be used to reinforce a beam or a crush can. (This will be described in more detail below.) While the strengthening member 20 is primarily discussed with respect to automotive applications, the cellular structure 22 may be used in a variety of different applications and fields including but not limited to: aerospace, sporting goods, building materials, shipping materials, deformable barriers, wind turbines, maritime vessels, high speed trains, and many others.

Each cell 24 may include eight sidewalls 26 interconnected at eight corners 28 to form a closed polygon 30. The sidewalls 26 may be straight. The sidewalls 26 cooperating to define eight internal angles ($\Phi_{ij}$) and eight external angles ($\Phi_{ej}$) located at the corners 28. The internal angles are the angles formed within the interior of the polygon 30 and the external angles are the angles formed on the outside of the polygon 30. The internal and external angles are mathematically related to each other by Equation 1: $\Phi_{ij}+\Phi_{ej}=360$ degrees.

Each cell 24 is a concave polygon, meaning a portion of the cell folds in, onto itself, as opposed to a standard octagon, which is a convex polygon. To form the cross-sectional shape shown, a first internal angle ($\Phi_{i1}$) at the first corner 28 and a forth internal angle ($\Phi_{i4}$) at the fourth corner 28d are acute causing the first sidewall 26a and the third sidewall 26c to extend inwardly. The first and third sidewalk are interconnected by the second sidewall 26b at the second and third corners 28b and 28c. The second corner 28b has a second internal angle ($\Phi_{i2}$) that is reflex. A reflex angle is an angle greater than 180 degrees but less than 360 degrees. The third corner 28c has a third internal angle ($\Phi_{i3}$) that is also reflex. The fourth sidewall 26d extends from the fourth corner 28d to the fifth corner 28e. The fifth corner 28e has a fifth internal angle ($\Phi_{i5}$) that is obtuse. The fifth sidewall 26e extends from the fifth corner 28e to the sixth corner 28f that has a sixth internal angle ($\Phi_{i6}$) that is obtuse. The sixth sidewall 26f extends from the sixth corner 28f to the seventh corner 28g that has a seventh internal angle (($\Phi_{i7}$) that is obtuse. The seven side 26g extends from the seventh corner 28g to the eight corner 28h that has an eighth internal angle ($\Phi_{i8}$) that is obtuse. The eight side 26h extends from the eighth corner 28h to the first corner 28a. The first sidewall 26a may have a same cross-sectional length (L) as the third sidewall 26c. The second sidewall 26b may have a same cross-sectional length as the six sidewall 26f and be parallel with each other. The fourth sidewall 26d may have a same cross-sectional length as the eighth sidewall 26h and be parallel with each other. The fifth sidewall 26e may have a same cross-sectional length as the seventh sidewall 26g. Use of the term "same" refers to a design dimension with the understanding that manufactured parts have tolerances. For example, two parts designed to have a same length might be slightly longer or shorter than each other due to manufacturing limitations.

Sidewalls 26e, 26f, and 26g form a front portion 32; sidewalls 26a, 26b, and 26c form a rear portion 34; and sidewalls 26d and 26h form side portions 36 and 38 of the cell 24. The front portion 32 and the rear portion 34 may be substantially identical to each other so that the front portion 32 of one of the cells 24 can form the rear portion 34 of an adjacent cell. As stated above, the sidewalls 26d and 26h are identical and are parallel so that one of the sidewalls 26d can form sidewall 26h of an adjacent cell. The cellular structure 22 may be formed so adjacent cells share one or more walls as described above. Alternatively, complete cells may be formed separately and then joined together. The eight-sided shape of this disclosure allows the cells to nest together without any voids between the cells. The cells 24 may be arranged within the cellular structure 22 with the side portions 36 and 38 aligned with each other to create a plurality of rows 44 of cells.

Each cell 24 has a longitudinal centerline 40 and a lateral centerline 42. The cell 24 is asymmetrical about the longitudinal centerline 40 and is symmetrical about the lateral centerline 42. As such, internal angles $\Phi_{i1}$ and $\Phi_{i4}$ are the same, internal angles $\Phi_{i2}$ and $\Phi_{i3}$ are the same, internal angles $\Phi_{i5}$ and $\Phi_{i8}$ are the same, and internal angles $\Phi_{i6}$ and $\Phi_{i7}$ are the same.

The cellular structure 22 may be formed from a plurality of different materials including metal, plastic, composite, silicone, semiconductor materials, paper, carboard, shape-memory materials, rubber, foam, gel, hybrid materials (i.e., combinations of dis-similar materials), or the like. The cellular structure 22 may be manufactured using a variety of techniques depending upon the materials chosen and the size and shape of the cellular structure 22. For example, the cellular structure 22 may be formed by stamping, bending, press forming, hydroforming, molding, casting, extrusion, welding, uniform or nonuniform roll forming, machining, forging, 3-D printing, and the like.

In some exemplary embodiments, one or more cells of the cellular structure may be partially or fully filled with various fillers. Further, a strengthening member may include multiple cellular structures with each cellular structure being partially or fully filled with different types of fillers. For example, where temperature control is desired, some or all the cells may be filled with thermally insulating filler(s). Exemplary thermally insulating fillers include various foams (e.g., blown fiber glass foam, polyurethane foams), mineral wool, cellulose, polystyrene aerogels, cork, and combinations thereof. Additionally or alternatively, in other embodiments, where sound control is required, some or all the cells of the cellular structure(s) may be partially or fully filled with noise insulating filler(s). Exemplary noise insulating fillers include sponge, melamine acoustic foams, mineral wool, open-cell rubber foams, and combinations thereof. In further embodiments, where further structural reinforcement is desired, the cells may be partially or fully filled with strengthening filler(s). Exemplary strengthening fillers include structural foam(s), such as thermoplastic structural foams, aluminum foams, glass or carbon fiber-reinforced structural foams, closed-cell polymer foams, and combinations thereof. In some exemplary embodiments, more than one type of filler may be incorporated in the cells. In other embodiments, a filler may provide more than one, or even all, of the thermally insulating, noise insulating, and strengthening functions and may partially or fully fill some or all the cells of the cellular structure. Alternatively, some or all the cells may be left unfilled (i.e., hollow or empty).

Figure 3:
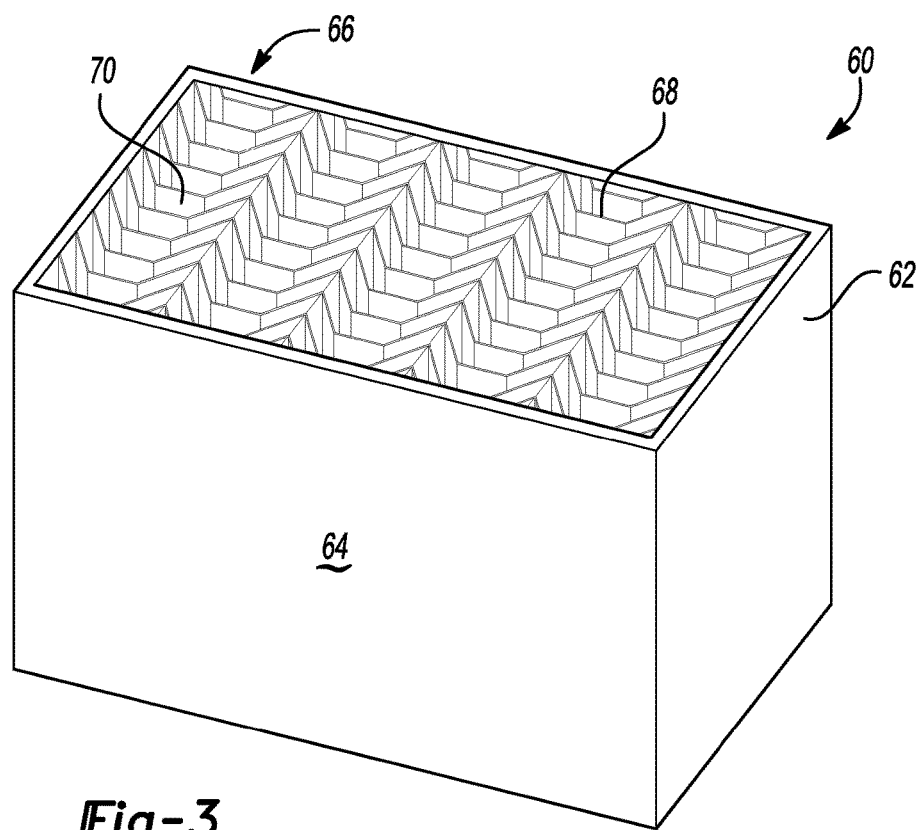
FIG. 3 is a perspective view of another strengthening member having an outer tubular member and an internal cellular structure with eight-sided cells.

Referring to FIG. 3, a strengthening member 60 may include a tubular member 62, e.g., a beam, defining an interior 66. The tubular member 62 may be formed of a plurality of interconnected sidewalls 64. In the illustrated embodiment, the tubular member 62 has a square cross section with four sidewalls. In other embodiments, the tubular member 62 may have any number of sidewalls depending upon the particular application of the strengthening member 60.

A cellular structure 68 is disposed within the interior 66 to reinforce the tubular member 62. Depending upon the application of the tubular member 62, the cellular structure 68 may be used to increase bending resistance, buckling, crush resistance, energy absorption, and the like. The cellular structure 68 includes a plurality of individual cells 70 that are interconnected and nested with other cells to form the cellular structure 68. Peripheral cells may be connected with the sidewalls 64 of the tubular member 62 to secure the cellular structure 68 within the tubular member 62 as well as to transfer loads between the tubular member 62 and the cellular structure 68. Each cell 70 may have eight sides arranged to form a concave polygon. The cells 70 may be the same or similar to the cells 24.

Parameters such as the dimensions (e.g., lengths and thicknesses) and the shape (e.g., corner angles) may be modified to tune the cellular structure according to its desired application. Modifying these parameters may increase or decrease the cell density of the cellular structure and may increase or decrease the strength of the strengthening member.

Figure 4:
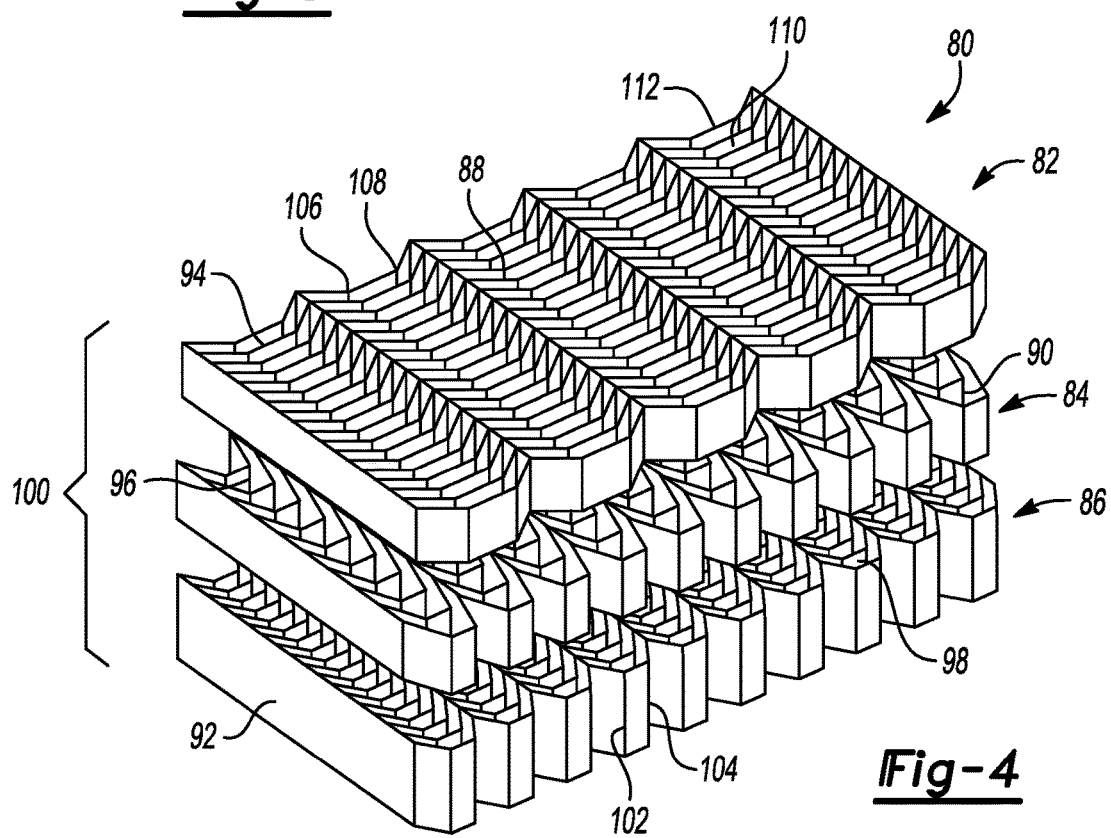
FIG. 4 is an exploded perspective view of yet another strengthening member having three different layers of cellular structures arranged in a stack.

Referring to FIG. 4, a strengthening member 80 includes a first layer 82, a second layer 84, and a third layer 86 arranged on top of each other to form a stack 100. Alternatively, the layers may be arranged in a horizontal array. Plates (not shown) may be disposed between the layers to facilitate attachment of the layers. The different layers may have different properties such as strength and/or energy absorption. The first layer 82 includes a first cellular structure 88 having a plurality of cells 94, the second layer 84 includes a second cellular structure 90 having a plurality of second cells 96, and the third layer 86 includes a third cellular structure 92 having a plurality of third cells 98. The cells 94, 96, and 98 all have a cross section with eight sidewalls interconnected to form a closed, concave polygon that is symmetrical about the lateral centerline and asymmetrical about the longitudinal centerline. The cross-sectional side lengths and the corner angles of the cells in each layer are different than the cells of the other layers to create different properties in each layer. In the illustrated embodiment, the cell density increases from the top towards the bottom of the stack 100 with the first layer 82 having the lowest cell density and the third layer 86 having the highest cell density. The cell density of the cellular structures may be increased by decreasing the internal angles of corners 102 and 104 and increasing the internal angles of corners 106 and 108 to reduce a width of the cells and/or by reducing a cross-sectional length of sidewalls 110 and 112 to reduce a length of the cells.

The strengthening member 80 may be used as an energy absorbing member on an automobile. For example, the stack 100 may be attached to the vehicle with the first layer 82 being the outer layer and with the third layer 86 being the bottom layer. The first layer 82 may be the weakest and is designed to crush under lower forces, whereas the second and third layers 84, 86 are stronger and configured to crush under larger forces. Multi-layered strengthening members can effectively absorb impacts of different magnitudes. For example, the softer first layer 82 is able to completely absorb lower impacts while producing lower reaction forces to limit damage to the impacting object. This is particularly useful when the impacting object is a person. Multilayered strengthening members may be particularly beneficial in a headliner of a vehicle to absorb collision energy between an occupant and the headliner. The softer first layer 82 may be configured to absorb impacts from smaller occupants whereas the stronger second and third layers 84, 86 may be configured to absorb impacts from larger occupants.

Multilayered strengthening members may also be used to reinforce a vehicle beam such as a crush can or front rail. The crush can or front rail may be reinforced with a softer outer layer proximate to the bumper and with successively stronger horizontal layers backing the outer layer. This may provide a more controlled crush during a collision. Of course, the uses of multilayer strengthening members is not limited to the examples provided in this disclosure.

Testing has demonstrated the improved strength and performance features of cellular structures having the eight-sided cells of this disclosure as compared to traditional honeycomb cellular structures. The testing was conducted using dynamic loading and quasi-static loading. The following figures illustrate the results from two such tests.

Figure 5:
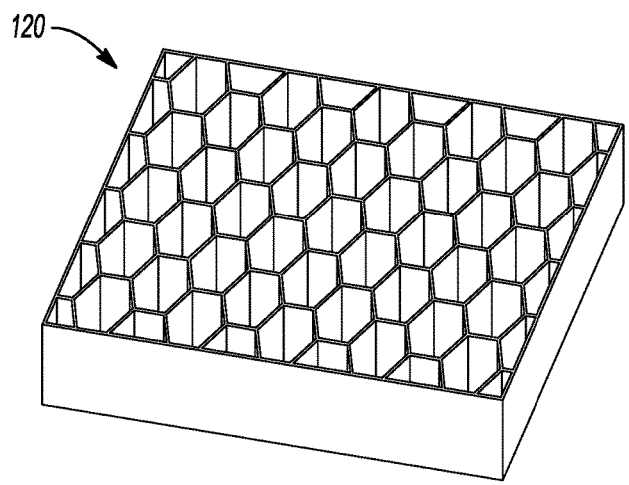
FIG. 5 is a perspective view of a first specimen having a honeycomb cellular structure.
Figure 6:
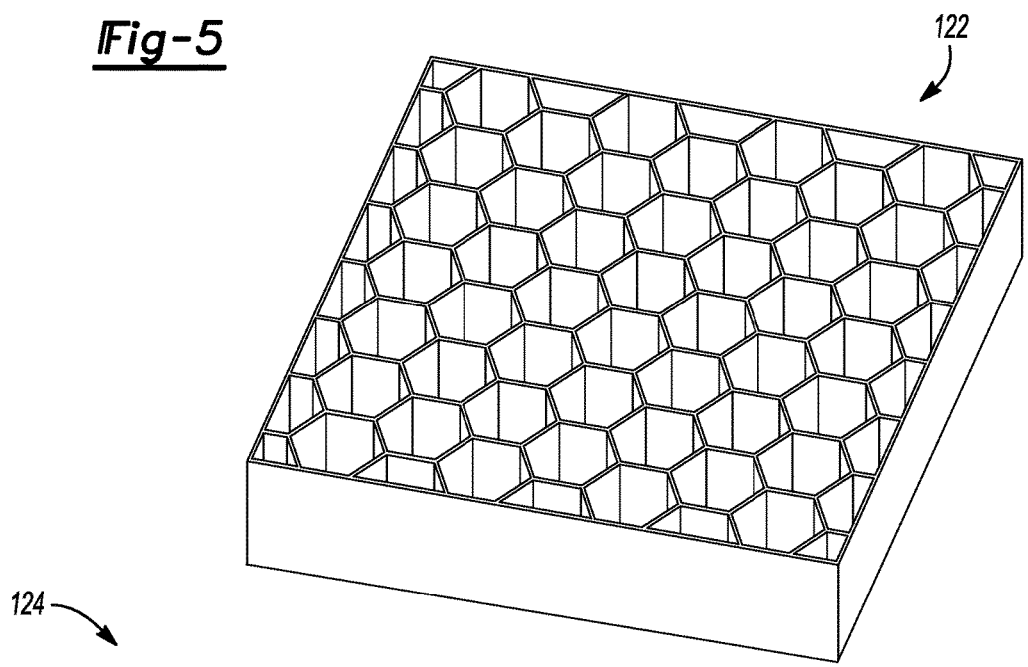
FIG. 6 is a perspective view of a second specimen having a honeycomb cellular structure.
Figure 7:
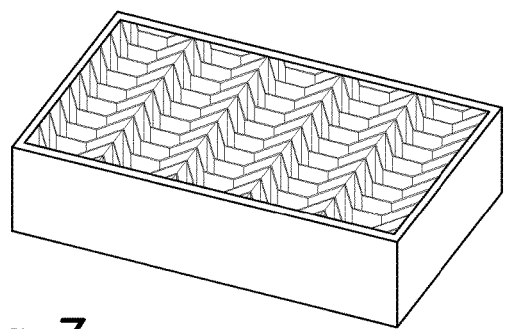
FIG. 7 is a perspective view of a third specimen having the eight-sided cellular structure of this disclosure.
Figure 8:
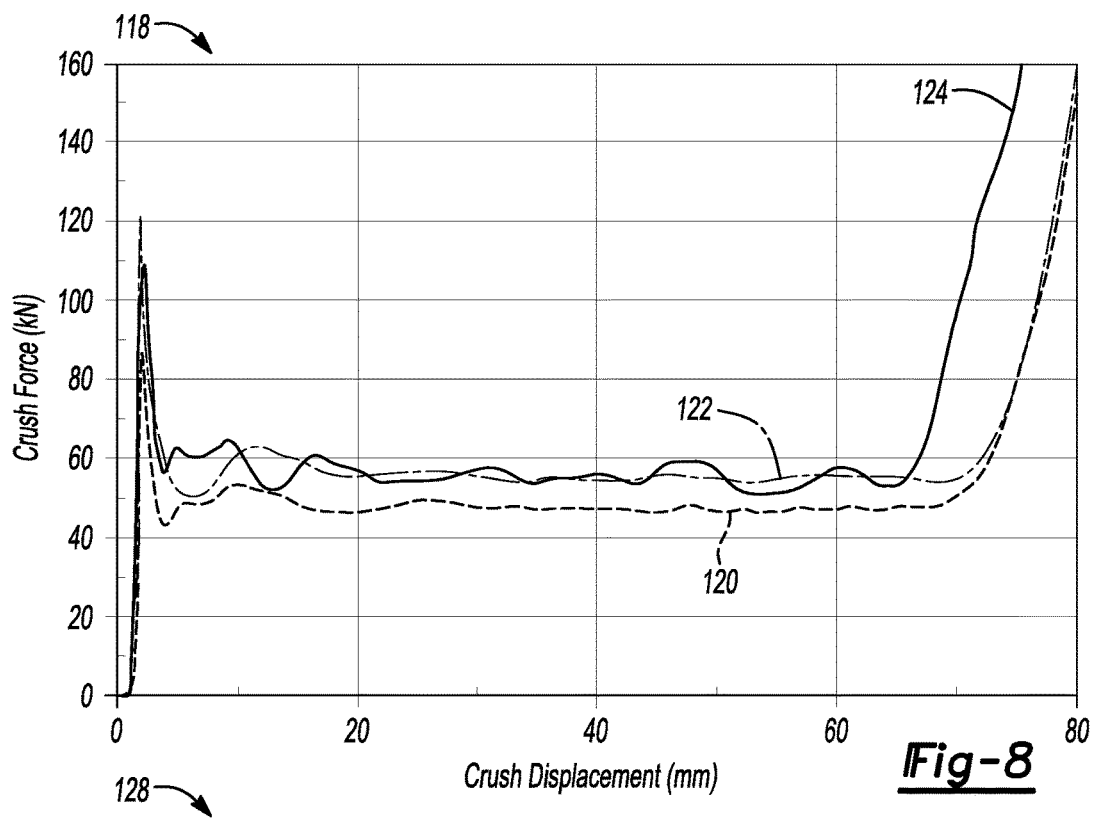
FIG. 8 is a graph showing crush force displacement results of a dynamic loading test for the specimens of FIGS. 5, 6, and 7.

FIG. 8 illustrates a graph 118 showing the results of a dynamic loading test between a first specimen 120 (shown in FIG. 5) having a honeycomb cellular structure, a second specimen 122 (shown in FIG. 6) also having a honeycomb cellular structure, and a third specimen 124 (shown in FIG. 7) having the eight-sided cellular structure of this disclosure. The first specimen 120 is a rectangular prism having a cross section of 178×178 millimeters (mm), weighing 0.25 kilograms (kg), and having 50 honeycomb cells. The second specimen 122 is a rectangular prism having a cross section of 240 mm×280 mm, weighing 0.37 kg, and having 56 honeycomb cells. The third specimen 124 is a rectangular prism having a cross section of 143 mm×84 mm, weighing 0.25 kg, and having 47.1 cells. All of the specimens were the same height, the same material, and had a same sidewall thickness.

During each dynamic loading test, an impactor is propelled into the specimen causing the specimen to crush. The graph 118 shows the crush force (y-axis) and the displacement (x-axis) for each specimen. The third specimen 124 outperformed both of the honeycomb specimens despite the second specimen 122 being 48% heavier. The following forces are the average crush forces between 0 and 60 mm of displacement. The third specimen 124 had the highest average crush force at 56.12 kilonewtons (kN). The second specimen 122 had the second highest average crush force at 55.87 kN and the first specimen 120 was the weakest at 47.68 kN. Thus, the eight-sided specimen 124 performed 18% better than the similarly sized honeycomb specimen 120 and 0.4% better than the larger honeycomb specimen 122. By using the eight-sided cellular structure of this disclosure, a lighter and smaller strengthening member may be used in place of a larger and heavier honeycomb strengthening member while still achieving a desired strength. While not shown in the graph, the testing also showed that the eight-sided cellular structure exhibits progressive and stable crush, and that the folding lengths of the third specimen 124 were smaller than those of the honeycomb specimens 120, 122 indicating that the eight-sided design is capable of achieving more intense energy absorption.

Figure 9:
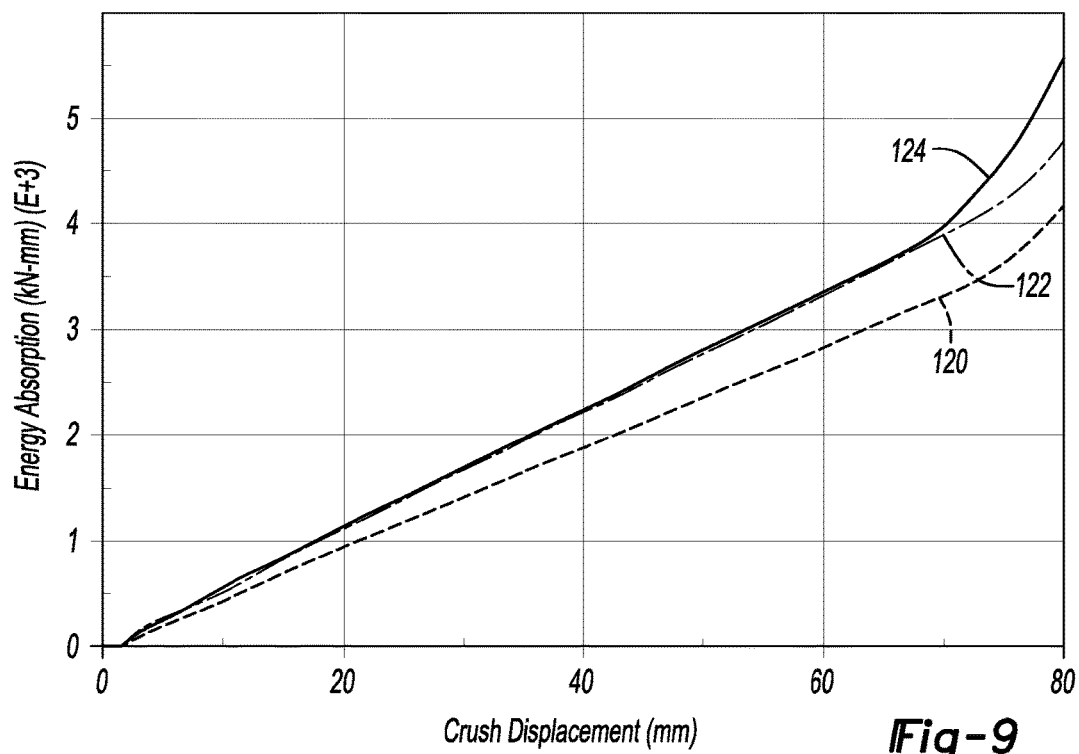
FIG. 9 is a graph showing energy absorption results of the dynamic loading test.

FIG. 9 is a graph 128 illustrating the results of energy absorption during the dynamic loading test. The graph 128 shows the energy absorption (y-axis) and the displacement (x-axis) for each specimen. The third specimen 124, which has the eight-sided cellular structure, outperformed the first and second specimens 122, 124. For example, at 60 mm, the third specimen 124 had an energy absorption of 3376.9 kN-mm, the first specimen 120 had an energy absorption of 2861.0 kN-mm, and the second specimen 120 had an energy absorption of 3352.41 kN-mm. Thus, the eight-sided specimen 124 outperformed both of the honeycomb specimens 120 and 122 by 18% and 1%, respectively, at 60 mm of displacement.

FIG. 10 illustrates a graph 130 showing the results of a quasi-static loading, e.g. passenger and/or cargo loading, test between the first specimen 120, the second specimen 122, and the third specimen 124. The third specimen 124 also out preformed the honeycomb specimens 120 and 122 in quasi-static loading. The third specimen 124 had a peak force of 101.4 kN, the first specimen had a peak force of 71.4 kN, and the second specimen 122 had a peak force of 90.2 kN. Thus, the third specimen 124 had a 42% higher peak force than the first specimen 120 and a 12.4% higher peak force than the second specimen 122. In terms of serviceability, these results translate to the third specimen 124 exhibiting more concentrated plastic deformation, which if replacement is required, will require less material and cost to replace than components having the honeycomb cellular structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A strengthening member for an automobile comprising: a cellular structure including a plurality of cells, a cross section of each cell having eight sidewalls interconnected at eight corners to define a closed polygon, the sidewalls define eight internal angles located at the corners, wherein two of the internal angles are acute and two of the internal angles are reflex.

2. The strengthening member of claim 1, wherein four of the internal angles are obtuse.

3. The strengthening member of claim 1, wherein each of the cells defines a lateral centerline and is symmetrical about the lateral centerline.

4. The strengthening member of claim 1, wherein each of the sidewalls are straight.

5. The strengthening member of claim 1, wherein a first sidewall of the sidewalls extends between one of the reflex angles and one of the acute angles, and a second sidewall of the sidewalls extends between the other of the reflex angles and the other of the acute angles, wherein the first and second sidewalls have a same cross-sectional length.

6. The strengthening member of claim 5, wherein four of the internal angles are obtuse, and wherein a third sidewall of the sidewalls extends between two of the four obtuse angles and a fourth sidewall of the sidewalls extends between the other two of the four obtuse angles, and the third and fourth sidewalls have a same cross-sectional length.

7. The strengthening member of claim 6, wherein a fifth sidewall of the sidewalls extends between the first sidewall and the second sidewall and a sixth of the sidewalls extends between the third sidewall and the fourth sidewall, wherein the fifth and sixth sidewalls have a same cross-sectional length.

8. The strengthening member of claim 7, wherein a seventh of the sidewalls extends between the first sidewall and the third sidewall and an eighth of the sidewalls extends between the second sidewall and the fourth sidewall, wherein the seventh and eighth sidewalls have a same cross-sectional length, and the first and the third sidewalls have a same cross-sectional length.

9. The strengthening member of claim 1 further comprising a tubular member defining an interior, wherein the cellular structure is disposed within the interior.

10. A strengthening member comprising:
a cellular structure including a plurality of cells, a cross section of each cell having eight sidewalls interconnected at eight corners, wherein the sidewalls are arranged to form a concave polygon with two of the corners having an acute internal angle.

11. The strengthening member of claim 10, wherein two of the corners of each cell have a reflex angle.

12. The strengthening member of claim 10 further comprising a tubular member defining an interior, wherein the cellular structure is disposed within the interior.

13. The strengthening member of claim 10, wherein the cellular structure is a first cellular structure, and further comprising a second cellular structure stacked on the first cellular structure, the second cellular structure including a plurality of second cells having a cross section that is different than the cells of the first cellular structure.

14. The strengthening member of claim 13, wherein the cross section of the second cells is a concave polygon having eight sidewalls interconnected at eight corners.

15. The strengthening member of claim 14, wherein two of the corners of each second cell have an acute internal angle.

16. The strengthening member of claim 15, wherein two of the corners of each second cell have a reflex internal angle.

17. The strengthening member of claim 13 further comprising a tubular member, wherein the first and second cellular structures are disposed in the tubular member with the first cellular structure stacked against the second cellular structure in a longitudinal direction of the tubular member.

18. A vehicle beam comprising:

a tubular member; and a cellular structure disposed in the tubular member and including a plurality of cells, a cross section of each cell being a closed, concave polygon with eight sidewalls interconnected at eight corners.

19. The vehicle beam of claim 18, wherein the sidewalls cooperating to define eight internal angles located at the corners, wherein two of the internal angles are acute and two of the internal angles are reflex.

20. The vehicle beam of claim 18, wherein the cross section includes a longitudinal centerline and a lateral center line, and the cross section is symmetrical about the lateral centerline and is asymmetrical about the longitudinal centerline.

* * * * *